United States Patent [19]

Wardley et al.

[11] Patent Number: 4,705,122

[45] Date of Patent: Nov. 10, 1987

[54] CUTTER ASSEMBLIES FOR ROTARY DRILL BITS

[75] Inventors: Michael T. Wardley, Stroud; David N. Shirley-Fisher, Cheltenham, both of England

[73] Assignee: NL Petroleum Products Limited, Gloucestershire, United Kingdom

[21] Appl. No.: 818,628

[22] Filed: Jan. 14, 1986

[30] Foreign Application Priority Data

Jan. 15, 1985 [GB] United Kingdom ............... 8500925

[51] Int. Cl.$^4$ ............................................. E21B 10/46
[52] U.S. Cl. .................................... 175/329; 175/410; 76/108 A
[58] Field of Search ............... 175/329, 409, 410, 413, 175/374; 76/108 A

[56] References Cited

U.S. PATENT DOCUMENTS

| | | | |
|---|---|---|---|
| 4,323,130 | 4/1982 | Dennis | 175/329 |
| 4,325,439 | 4/1982 | Vezirian | 175/329 |
| 4,351,401 | 9/1982 | Fielder | 175/329 |
| 4,373,410 | 2/1983 | Davis | 175/329 X |
| 4,382,477 | 5/1983 | Barr | 175/410 |
| 4,471,845 | 9/1984 | Jurgens | 175/329 |
| 4,478,297 | 10/1984 | Radtke | 175/329 |
| 4,478,298 | 10/1984 | Hake et al. | 175/329 |
| 4,570,725 | 2/1986 | Matthias et al. | 175/329 |

Primary Examiner—Stephen J. Novosad
Attorney, Agent, or Firm—Browning, Bushman, Zamecki & Anderson

[57] ABSTRACT

A cutter assembly, for a rotary drill bit, comprises a generally cylindrical stud to be received in a socket in the surface of the bit body, the stud being formed, adjacent one end thereof, with a plane surface inclined at an angle of less than 90° to the longitudinal axis of the stud, and a preform cutting element mounted on the inclined surface. The dimensions of the cutting element, and its location on the inclined surface, are such that no part of the cutting element projects beyond the peripheral surface of the stud as viewed axially thereof. The cutting element may be so shaped and located that it initially projects beyond the peripheral surface of the stud, the projecting portions subsequently being removed, for example by grinding.

18 Claims, 15 Drawing Figures

CUTTER ASSEMBLIES FOR ROTARY DRILL BITS

BACKGROUND OF THE INVENTION

The invention relates to cutter assemblies for rotary drill bits for use in drilling or boring deep holes in subsurface formations.

The cutting assemblies are for use in rotary drill bits of the kind comprising a bit body having a shank for connection to a drill string, a plurality of cutter assemblies mounted at the surface of the bit body, and a channel in the bit body for supplying drilling fluid to the surface of the bit for cleaning and/or cooling the cutters. Each cutter assembly comprises a generally cylindrical stud which is received in a socket in the surface of the bit body, the stud being formed, adjacent one end thereof, with a plane surface disposed at an angle of less than 90° to the longitudinal axis of the stud, and a preform cutting element being mounted on the inclined surface of the stud. The preform cutting element may be of the kind comprising a tablet, usually circular, having a thin hard cutting layer of polycrystalline diamond bonded to a thicker, less hard backing layer, for example of tungsten carbide.

In order to provide adequate support for the stud in the bit body, and to locate the cutting edge of the cutting element in the desired relation to the surface of the bit body, it is normally desirable for a portion of the cutting element to lie below the surface of the bit body. In known forms of cutter assembly of the above-mentioned type, it has been usual for peripheral portions of the cutting element, as viewed axially of the stud, to project beyond the peripheral surface of the stud. This is normally the case even if the stud is of greater diameter than the cutting element, since the location of the cutting element on the inclined plane is such that its maximum width does not lie on the longitudinal axis of the stud, but lies to one side of that axis, where the width of the stud is less.

In order to allow a part of the cutting element to project below the surface of the bit body, therefore, it has normally been the practice to counterbore the mouth of the socket for receiving the stud so as to provide a clearance for the projecting portion of the cutting element. A disadvantage of this arrangement, however, is that the provision of the counterbore to clear the cutting element also removes some of the support which would otherwise be provided for the back of the stud by the bit body. In order to overcome this disadvantage, it has been proposed, as described in U.S. Pat. No. 4,465,148, that the counterbore should be eccentric with relation to the stud-receiving socket, the internal surface of one side of the counterbore forming a continuation of the internal surface of the socket so as to provide a continuous support for the back of the stud while at the same time providing clearance for the cutting element on the forward side of the stud.

However, such arrangement has the disadvantage of making the manufacture of the drill bit more complicated since the counterbore must be exactly positioned according to the required orientation of the cutter assembly. The present invention sets out to provide an improved cutter assembly, and method of manufacturing a drill bit, which provides the advantages of the eccentric counterbore arrangement while at the same time simplifying, rather than complicating, the manufacture of the drill bit, and thus reducing its cost.

SUMMARY OF THE INVENTION

According to the invention there is provided a cutter assembly, for a rotary drill bit, of the kind comprising a generally cylindrical stud to be received in a socket in the surface of the bit body, the stud being formed, adjacent one end thereof, with a plane surface disposed at an angle of less than 90° to the longitudinal axis of the stud, and a preform cutting element mounted on said surface, the dimensions of the cutting element, and its location on said surface, being such that no part of the cutting element projects beyond the peripheral surface of the stud as viewed axially thereof.

It will thus be appreciated that, since no part of the cutting element projects beyond the peripheral surface of the stud, any portion of the cutting element may extend into the socket which receives the stud without the necessity of providing a counterbore. The extent to which the cutting element lies below the surface of the bit body is thus simply determined by the depth of the socket and the cutter assembly may be located in the hole in any required rotational orientation. In view of this, and in view of the fact that no counterboring operation is required, the manufacture of the drill bit is made significantly simpler and therefore less costly.

The generally cylindrical stud may be substantially circular in cross section, although the invention is applicable to studs of any configuration.

Typically, the plane surface on which the cutting element is mounted may be disposed at an angle of less than 60° to the longitudinal axis of the stud. The cutting element itself may be substantially circular and of substantially constant thickness, but any other conventional shape of preform cutting element may also be employed.

The materials and other characteristics of the stud and cutting element may be of any of the kinds well known in the art. For example the cutting element may comprise a front cutting face of polycrystalline diamond or other superhard material bonded to a backing layer of less hard material, such as tungsten carbide, the backing layer being bonded to said inclined plane surface of the stud. Alternatively, the cutting element may be formed from thermally stable polycrystalline diamond.

The stud itself may be formed, for example, from tungsten carbide or from steel.

The invention also provides a method of manufacturing a cutter assembly, for a rotary drill bit, of the kind comprising a generally cylindrical stud to be received in a socket in the surface of the bit body, the stud being formed, adjacent one end thereof, with a plane surface inclined at an angle of less than 90° to the longitudinal axis of the stud, and a preform cutting element mounted on said surface, the method comprising the steps of forming said preform cutting element such that it is not larger than said inclined plane surface on the stud, and then mounting the cutting element on the inclined surface on the stud in such location that no part of the cutting element projects beyond the peripheral surface of the stud as viewed axially thereof.

According to another important aspect of the invention, there is provided an alternative method of manufacturing a cutter assembly of the kind referred to, the method comprising the steps of mounting the cutting element on the inclined surface on the stud in such location that at least one portion of the cutting element projects beyond the peripheral surface of the stud as viewed axially thereof, and then removing said projecting portion of the cutting element. For example said projecting portion of the cutting element may be removed by grinding.

The cutting element, if it is large enough, may be initially mounted on the inclined planed surface of the stud so as to extend over the whole of said surface as well as projecting beyond at least part of the periphery thereof. Alternatively, the cutting element may be initially mounted on the inclined plane surface so as to extend over only a part thereof. For example, the cutting element may be mounted at least partly in a rebate in the inclined surface.

As will be described in greater detail below, the above-mentioned method according to the invention may also result in the shape of the finished cutter assembly having other advantages. For example, where the stud is circular in cross-section the removal of projecting portions of the cutting element so that it conforms at least partly to the peripheral surface of the stud may result in a cutting element in which there is little variation in the width of the cutting edge of the element as it wears during use. With conventional circular cutting elements there is a steady increase in the width of the cutting edge as the element wears, with resultant increase in frictional resistance forces. This not only causes an increase in the torque required to rotate the drill but also results in an increase of heat generation with consequent risk of thermal damage to the cutting elements and/or failure of the bonds between the cutting elements and their studs.

Furthermore, where the cutting edges of the elements remain of substantially constant width adjacent cutter assemblies will act on closely adjacent areas of the surface of the formation being drilled. With conventional circular cutting elements a large number of cutter assemblies is required, mounted on a plurality of radially extending blades on the drill bit, to ensure that the whole surface of the formation is swept by cutting elements. Where cutter assemblies are formed by the method of the present invention, the whole of the surface of the formation may be swept by rows of cutting elements on only a few blades, for example only two blades. It is considered that a reduction in the number of blades carrying cutting elements may be advantageous since it allows large areas between adjacent blades for removal of cuttings.

Another advantage of at least a portion of the peripheral surface of the cutting element being a continuation of the peripheral surface of the stud is that a support surface on the bit body which supports the stud may also assist in supporting the cutting element, thus reducing stresses in the bond between the cutting element and the stud due to loads to which the cutter assembly is subjected during drilling.

DETAILED DESCRIPTION OF THE PREFERRED EMBODIMENTS

Figure 1:
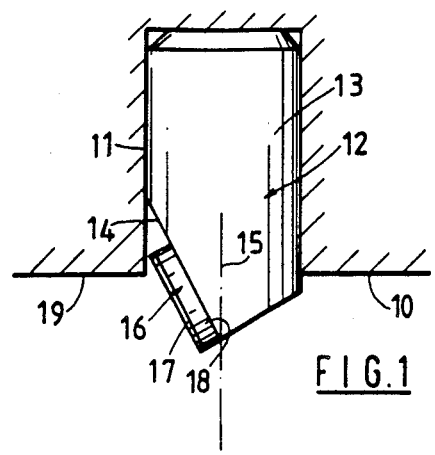
FIG. 1 is a section through a portion of a bit body showing a typical cutter assembly according to the invention.

Referring to FIG. 1, the bit body is indicated at 10 and, as is well known, may be formed from steel or matrix material. The general arrangement of such drill bits is well known and will not therefore be described in detail. The bit body is formed over the surface thereof with a plurality of cylindrical sockets 11 of circular cross-section and received in each socket, usually as an interference fit, is a cutter assembly 12.

The cutter assembly comprises a generally cylindrical stud 13, formed for example from tungsten carbide, which is formed adjacent one end thereof with an inclined plane surface 14 which is disposed at an angle of less than 90° to the longitudinal axis 15 of the stud 13.

Mounted on the inclined surface 14, for example by 'LS bonding' is a preform cutting element 16 comprising a cutting layer 17 of polycrystalline diamond bonded to a thicker backing layer 18 of tungsten carbide. The cutting element 16 is in the form of a circular disc.

Figure 2:
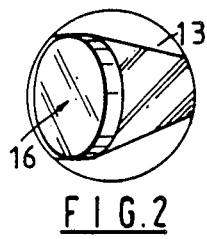
FIG. 2 is an end view of the cutter assembly, as viewed in the axial direction.

As best seen in FIG. 2, the diameter of the cutting element 16 in relation to the cross-section of the stud 13, and its position on the inclined plane 14, is such that no part of the cutting element projects beyond the peripheral surface of the stud as viewed axially. Accordingly, the cutter assembly may be located at any axial depth within the hole 11 without the cutting element fouling the surface of the bit body. It is not therefore necessary to counterbore the socket 11 to provide clearance for the cutting element and the socket 11 is simply formed to the required depth so that a portion of the cutting element 16 lies below the surface 19 of the bit body and a portion projects beyond the surface.

Figure 3:
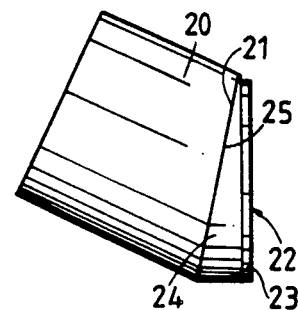
FIG. 3 is a side elevation of an alternative form of cutter assembly.
Figure 4:
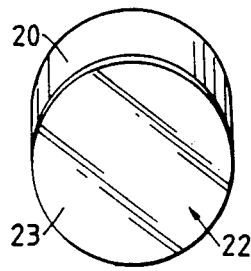
FIG. 4 is a front view of the assembly of FIG. 3.

FIGS. 3 and 4 show an alternative form of cutter assembly, according to the invention, in which no part of the cutting element projects beyond the peripheral surface of the stud as viewed axially. In this case the cylindrical stud 20 is formed adjacent one end thereof with an inclined plane surface 21 which is disposed at an angle of less than 90° to the longitudinal axis of the stud. The preform cutting element 22 comprises a cutting layer 23 bonded to a backing layer 24. In this case the rear surface 25 of the backing layer 24 is inclined at an angle to the front cutting face so that the backing layer 24 is generally wedge shaped.

Again, with the arrangement shown in FIGS. 3 and 4 the cutter assembly may be located at any axial depth within a socket in the bit body without the cutting element 22 fouling the surface of the bit body.

It should be pointed out that cutter assemblies are known in which the cutting element 16 does not project forwardly of the stud 13 as viewed in side elevation (as in FIG. 1). In such known assemblies, however, the cutting element still projects beyond the periphery of the stud width-wise, as may be seen by viewing the assembly axially. This is due to the fact that the maximum width of the cutting element does not lie on the longitudinal axis of the stud, where the stud is of maximum width, but is displaced forwardly of the longitudinal axis and lies on a part of lesser width.

Figure 6:
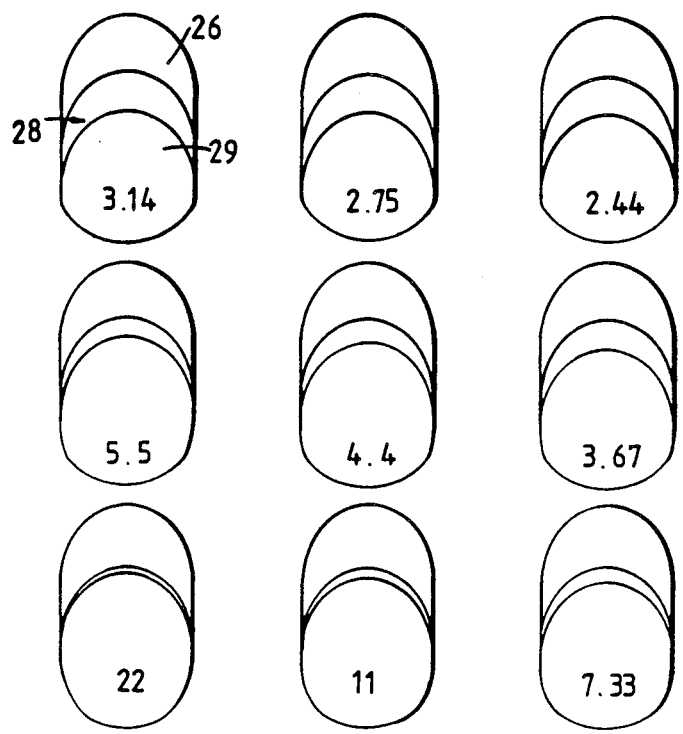
FIG. 6 shows nine alternative configurations of the cutting element in the assembly of FIG. 5, depending on the ratio of width to thickness of the cutting element.
Figure 5:
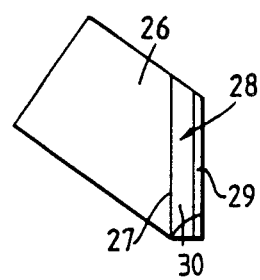
FIG. 5 is a side elevation of another cutter assembly according to the invention.

FIGS. 5 and 6 show an alternative arrangement in accordance with the invention. In this case the cutter assembly comprises a generally cylindrical stud 26 of circular cross-section which is formed adjacent one end thereof with an inclined plane surface 27 which is disposed at an angle of less than 90°, and preferably less than 60°, to the longitudinal axis of the stud. For example, the surface may be inclined at an angle of substantially 55° to the longitudinal axis of the stud, as shown in FIG. 5.

Mounted on the inclined surface 27, for example by 'LS bonding', is a preform cutting element 28 comprising a cutting layer 29 of polycrystalline diamond bonded to a thicker backing layer 30 of tungsten carbide.

Since the stud 26 is of circular cross-section the surface 27 is generally elliptical in shape. The cutting element 28 is initially in the form of a blank of such a size and shape that it is larger than the surface 27 so that when first bonded to the surface 27 peripheral portions of the cutting element project beyond the peripheral surface of the stud 26. These projecting portions are then removed, for example by grinding, until, as shown, no portion of the cutting element 28 projects beyond the peripheral surface of the stud 26. Around the major part of its periphery, therefore, the peripheral surface of the cutting element 28 forms a continuation of the peripheral surface of the stud 26 whereas at other locations the peripheral surface will lie inwardly of the peripheral surface of the stud, as viewed axially of the stud.

The precise shape of the front cutting face of the cutting element 28, as viewed in its direction of movement during drilling, which results from the grinding operation will depend on the thickness of the cutting element in relation to its width and FIG. 6 shows nine alternative configurations, the value of the width/thickness ratio of the cutting element being indicated on each drawing.

It will be appreciated that the effect of different width/thickness ratios will depend on the particular angle of inclination and location of the cutting element on the stud. Accordingly, the shapes of cutting face shown in FIGS. 6, 8, 10 and 12 for each width/thickness ratio will only apply to the particular angle and location of the cutting element shown in the preceding figure. It may be possible to achieve shapes similar to those shown at different width/thickness ratios, by suitably adjusting the angle and/or location of the cutting element on the stud.

Referring to FIG. 6, where the cutting element is thin, indicated by a high width/thickness ratio, for Example 22, the cutting element, after grinding, is nearly elliptical in shape. As the width/thickness ratio is reduced, however, i.e. as the cutting element is increased in thickness, the shape of the front cutting face of the cutting element changes as shown in FIG. 6.

It will be seen that when the ratio is in the range of about 2 to about 7 the bottom edge of the cutting element is much flatter, i.e. is of much larger radius, than it is when the ratio is higher. Consequently, as the lower cutting edge of the cutting element wears away in use a point is rapidly reached whereafter the overall width of the cutting edge changes little with further wear. This is in contrast to the more conventional circular cutting element where the effective width of the lower cutter edge of the element continues to increase steadily until half of the cutting element has worn away. In the arrangements shown where the width/thickness ratio is in the range of 2 to 7, on the other hand, the effective width of the lower cutting edge of the cutting element changes little during a large part of the wear of the cutting element. Consequently, each cutting element will act on a wide strip of formation, of substantially constant width, during the major part of its life.

Preferably the width/thickness ratio of the cutting element is in the range of 3 to 6 since this range provides the best approximation to constant width of the cutting element after initial wear.

The closeness between adjacent cutting assemblies on a bit body is determined by structural characteristics of the bit body and of the studs 26 and there is normally a minimum distance between adjacent studs. With conventional circular preforms, each cutting element acts on a strip of formation which is significantly narrower than the width of the stud and, consequently a large number of cutter assemblies are required to ensure that cutting elements act over the whole surface of the formation. Since, however, the effective cutting width according to the present invention is wide in relation to the width of the stud it follows that the gap between the cutting paths of two adjacent cutting elements is kept to a minimum and the number of cutter assemblies may therefore be reduced. It is usually preferred that the cutting elements be mounted on the drill bit so that, over most or all of the bit body, every portion of the surface of the formation being drilled has at least one cutting element sweeping over or close to it. In order to achieve this with known cutting structures, it is frequently the practice to provide a plurality of spaced radially extending blades on the surface of the bit body, a plurality of cutter assemblies being spaced along each blade. In view of the closeness of adjacent cutting paths of adjacent cutting elements provided by the present invention, it is possible to reduce the number of cutter assemblies and to sweep the whole of the area of the bottom surface of the formation by cutter assemblies mounted on only a few blades, for example only two blades.

The cutting element 28, before mounting on the stud 26 and grinding, may comprise a blank of any suitable shape although, in the arrangement of FIGS. 5 and 6, the blank must be larger than the surface 27. The blank may be initially circular but any other suitable shape may be used. In order to keep the grinding of the hard material of the blank to a minimum, the blank may be cut to a preliminary shape by a more convenient process such as electro-discharge machining. The blank is cut to a shape where it is only slightly larger than the surface 27 on the stud 26 leaving only a small projecting portion of the blank to be ground off level with the surface of the stud.

Although the stud is shown as being of circular cross-section, it will be appreciated that other forms of cylindrical stud may be used. In particular, the close packing advantage referred to above may be enhanced by using studs which are rectangular in cross-section.

Figure 8:
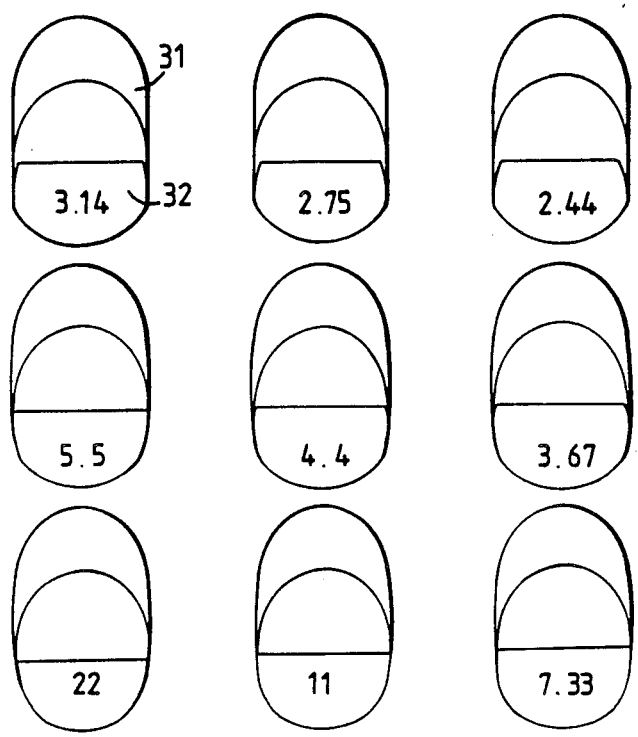
FIGS. 7 and 8, FIGS. 9 and 10 and FIGS. 11 and 12 are similar views to FIGS. 5 and 6 respectively, showing alternative configurations of cutter assembly.
Figure 7:
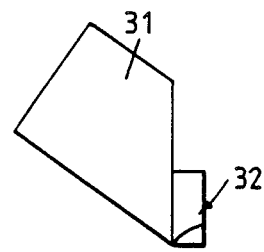
Figure 10:
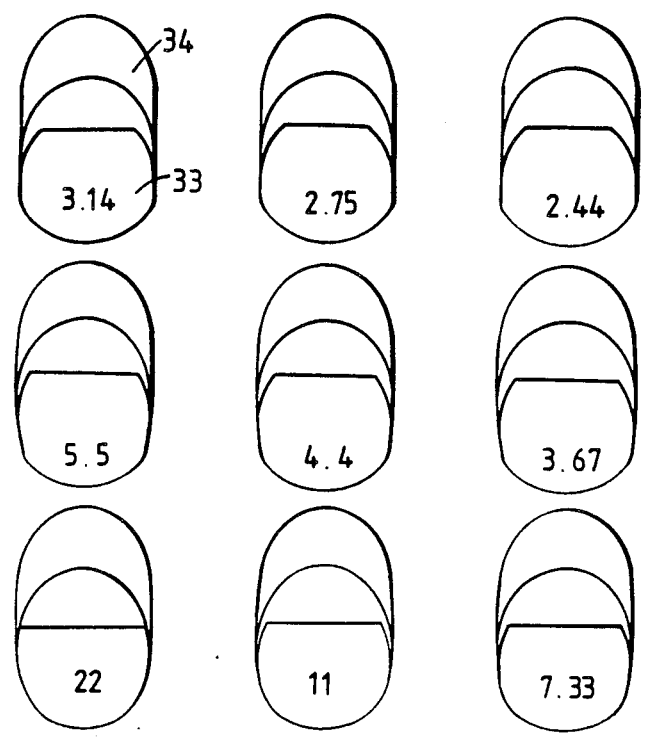
Figure 9:
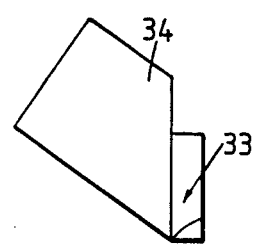

Instead of the cutting element extending over the whole of the inclined surface of the stud, it may extend over only part of the surface as shown in FIGS. 7 and 8, where the stud is indicated at 31 and the smaller cutting element is indicated at 32. Such an arrangement, since the cutting elements are smaller than in the arrangement of FIGS. 5 and 6, may provide even more economical use of preform blanks since two or more small cutting elements may be formed from a single blank. FIG. 8 is similar to FIG. 6 and shows the shape of the front cutting surface of the cutting element 32 according to various width/thickness ratios. It will again be seen that the most satisfactory ratio is generally in the range of 3 to 6 since this provides a cutting element of substantially constant width during most of its wear. FIGS. 9 and 10 show a somewhat similar arrangement to FIGS. 7 and 8 where the cutting element 33 extends over a greater proportion of the surface on the stud 34. It will be seen that such arrangement provides a greater area of cutting element, and thus a greater period of wear, while still maintaining, at the most favourable width/thickness ratios, a large portion where the width of the cutting element varies little as the element wears.

Figure 12:
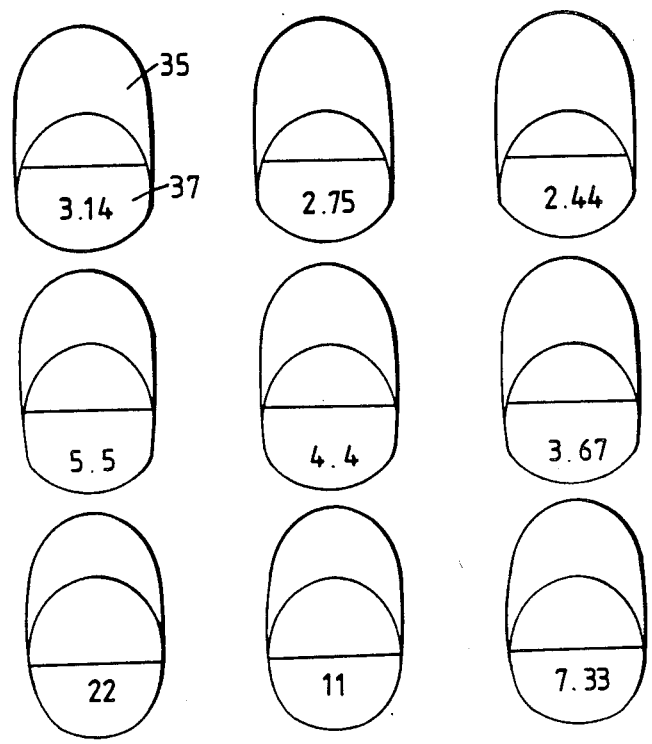
Figure 11:
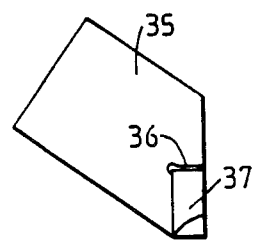

FIGS. 11 and 12 show an arrangement somewhat similar to that shown in FIGS. 7 to 8 but in this case the inclined surface of the stud 35 is formed with a rebate 36 in which the cutting element 37 is received. The shoulder of the rebate provides support for the cutting element when it is subjected to vertical loads, for example sustained and/or impact loads, and thus reduces the stress applied to the bond between the back of the cutting element and the surface of the stud.

In the example shown, the cutting element lies entirely within the rebate, but in alternative arrangements part of the element may project from the rebate. For example, the depth of the rebate may be smaller than the thickness of the cutting element. Also the rebate and cutting element may be of a shape other than that shown, for example the shoulder of the rebate might be arcuate.

Figure 13:
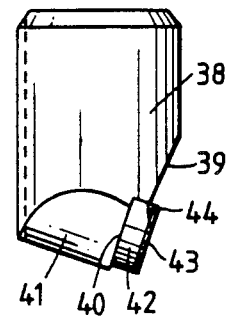
FIG. 13 is a side elevation of a further cutter assembly in accordance with the invention.
Figure 15:
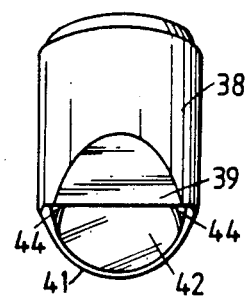
FIG. 15 is a front elevation of the cutter assembly of FIG. 13.
Figure 14:
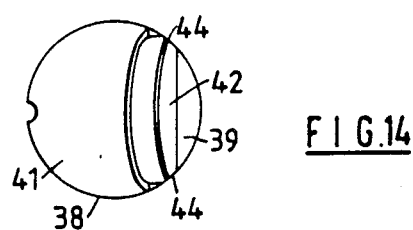
FIG. 14 is an end elevation of the cutter assembly of FIG. 13.

FIGS. 13 to 15 show a further form of cutter assembly in accordance with the invention. The assembly comprises a generally cylindrical stud 38 of circular cross-section, formed adjacent one end with an inclined plane surface 39 formed with a rebate 40. The end of the stud adjacent the inclined plane 39 is rounded off as indicated at 41.

A semi-circular preform cutting element 42 is bonded in the rebate 40. The thickness of the preform is greater than the depth of the rebate so that the cutting face 43 of the preform projects beyond the surface 39 (see FIG. 13).

The size of the preform is such that when bonded within the rebate the corners at opposite ends of the straight side of the preform project beyond the periphery of the stud 38. After bonding, therefore, the projecting corners are removed, for example by grinding, so that the surface of the preform at the corners is flush with the peripheral surface of the stud, as indicated at 44.

It will be appreciated that the arrangements shown in the drawings are given by way of example only, and the invention includes within its scope any other shape of cutting element and stud. However, the invention only relates to cutter assemblies where the cutting element is mounted on a plane surface disposed at an angle of less than 90° to the longitudinal axis of the stud, and does not include within its scope known arrangements where the cutting element is disposed at 90° to the longitudinal axis of the stud. In such cases the stud forms, in effect, a co-axial continuation of the cutting element and extends into the bit body at an angle. In such an arrangement the problem solved by the present invention does not, of course, arise.

We claim:

1. A rotary drill bit comprising a bit body formed over the surface thereof with a plurality of generally cylindrical sockets, there being mounted within each socket a cutter assembly comprising a generally cylindrical stud, one end portion of the stud being received and secured within the socket and an opposite end portion of the stud projecting from the socket, said projecting portion of the stud being formed with a plane surface inclined at an angle of less than 90° to the longitudinal axis of the stud and a preform cutting element being mounted on said surface, the dimensions of the cutting element, and its location on said surface, being such that no part of the cutting element projects beyond the peripheral surface of the stud as viewed axially thereof, the cutting element having a portion thereof disposed within the socket and at least that part of the stud which lies rearwardly of said portion of the cutting element, with respect to the normal direction of movement of the cutter assembly in use during drilling, engages and is supported by an internal surface of the socket.

2. A drill bit according to claim 1, wherein the generally cylindrical studs and sockets are substantially circular in cross section.

3. A drill bit according to claim 1, wherein the plane surface on which the cutting element is mounted is inclined at an angle of less than 60° to the longitudinal axis of the stud.

4. A drill bit according to claim 3, wherein the plane surface on which the cutting element is mounted is inclined at an angle of substantially 55° to the longitudinal axis of the stud.

5. A drill bit according to claim 1, wherein the cutting element is substantially circular and of substantially constant thickness.

6. A drill bit according to claim 1, wherein the cutting element extends across only a part of said plane surface on which it is mounted.

7. A drill bit according to claim 6, wherein said plane surface is formed with a rebate extending across a part of said surface, the cutting element being mounted at least partly in said rebate.

8. A drill bit according to claim 1, wherein the cutting element has a peripheral surface at least a part of which forms a smooth continuation of the adjacent peripheral surface of the stud.

9. A drill bit according to claim 1, wherein the cutting element comprises a front cutting face of superhard material bonded to a backing layer of less hard material, the backing layer being bonded to said inclined plane surface of the stud.

10. A drill bit according to claim 9, wherein the superhard material is polycrystalline diamond and the less hard material is tungsten carbide.

11. A drill bit according to claim 1, wherein the cutting element comprises a single layer of thermally stable polycrystalline diamond.

12. A drill bit according to claim 1, wherein the stud is formed from tungsten carbide.

13. A drill bit according to claim 1, wherein the stud is formed from steel.

14. A method of manufacturing a cutter assembly, for a rotary drill bit, of the kind comprising a generally cylindrical stud to be received in a socket in the surface of the bit body, the stud being formed, adjacent one end thereof, with a plane surface inclined at an angle of less than 90° to the longitudinal axis of the stud, and a preform cutting element mounted on said surface, the method comprising the steps of mounting the cutting element on the inclined surface on the stud in such location that at least one portion of the cutting element projects beyond the peripheral surface of the stud as viewed axially thereof, and then removing said projecting portion of the cutting element.

15. A method according to claim 14, wherein said projecting portion of the cutting element is removed by grinding.

16. A method according to claim 14, wherein said preform cutting element, before mounting on the inclined surface of the stud, is cut from a larger preform blank.

17. A method according to claim 14, wherein said preform cutting element, before mounting on the inclined surface of the stud, is generally circular.

18. A method according to claim 14, wherein said preform cutting element is mounted on the inclined plane surface of the stud so as to extend over only a part thereof.

* * * * *